United States Patent
Murakata

(10) Patent No.: US 7,684,065 B2
(45) Date of Patent: Mar. 23, 2010

(54) UNAUTHORIZED COPY PREVENTING SYSTEM, UNAUTHORIZED COPY PREVENTING METHOD, UNAUTHORIZED COPY PREVENTING PROGRAM AND COMPUTER-READABLE INFORMATION RECORDING MEDIUM

(75) Inventor: Akira Murakata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1450 days.

(21) Appl. No.: 11/048,886

(22) Filed: Feb. 3, 2005

(65) Prior Publication Data

US 2005/0219604 A1 Oct. 6, 2005

(30) Foreign Application Priority Data

Feb. 5, 2004 (JP) .............................. 2004-029975

(51) Int. Cl.
 *G06K 15/00* (2006.01)
 *G06F 3/12* (2006.01)
(52) U.S. Cl. ..................................... 358/1.14; 358/1.15
(58) Field of Classification Search .................. 358/1.1, 358/1.9, 1.13, 1.14, 1.15, 1.16, 1.17, 1.18, 358/407, 468, 404, 444, 437, 448; 347/2, 347/3, 5, 14, 23; 399/1, 8; 382/303, 304, 382/307; 380/243, 55
See application file for complete search history.

(56) References Cited

U.S. PATENT DOCUMENTS

| 5,720,012 | A | * | 2/1998 | McVeigh et al. ........... 358/1.14 |
| 6,067,088 | A | | 5/2000 | Tanioka et al. |
| 6,272,248 | B1 | | 8/2001 | Saitoh et al. |
| 6,538,759 | B1 | * | 3/2003 | Hiraishi et al. ............. 358/1.14 |
| 2003/0009656 | A1 | | 1/2003 | Yamamura |
| 2003/0095272 | A1 | | 5/2003 | Nomizu |
| 2003/0159046 | A1 | * | 8/2003 | Choi et al. .................. 713/176 |
| 2004/0261074 | A1 | | 12/2004 | Murakata |

FOREIGN PATENT DOCUMENTS

| EP | 0 751 663 A2 | 1/1997 |
| JP | 6-237379 | 8/1994 |
| JP | 8-274986 | 10/1996 |
| JP | 9-114967 | 5/1997 |
| JP | 9-282305 | 10/1997 |
| JP | 2001-76125 | 3/2001 |
| JP | 2002-77602 | 3/2002 |
| JP | 2002-245447 | 8/2002 |
| JP | 2003-203236 | 7/2003 |
| JP | 2003-216365 | 7/2003 |
| JP | 2003-234894 | 8/2003 |

* cited by examiner

*Primary Examiner*—Dov Popovici
(74) *Attorney, Agent, or Firm*—Oblon, Spivak, McClelland, Maier & Neustadt, L.L.P.

(57) ABSTRACT

An unauthorized copy preventing system for preventing unauthorized copy of an image in an image forming apparatus which carries out image forming, by carrying out predetermined processing on digital image information, includes: a digital signal processor for image processing configured to carry out predetermined image processing on an input image; a digital signal processor for security processing configured to produce an unauthorized copy determination result for determining whether or not unauthorized copy is being carried out on the image having undergone the image processing by the digital signal processor for image processing; and a digital signal processor control device configured to control the digital signal processor for image processing and the digital signal processor for security processing and prevent unauthorized copy.

26 Claims, 11 Drawing Sheets

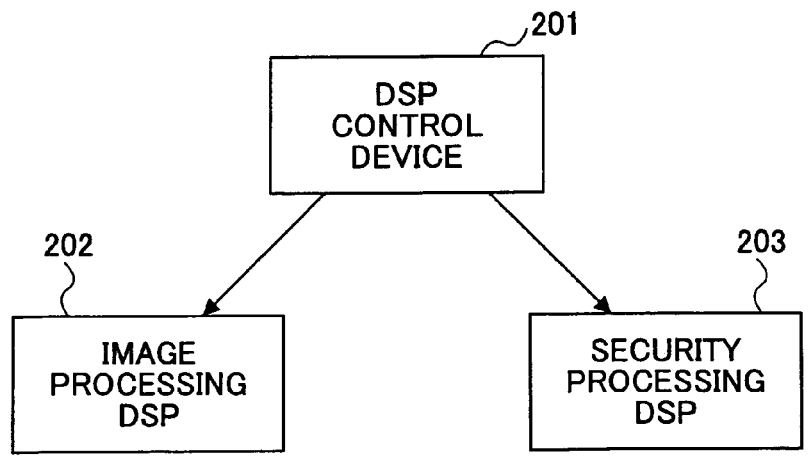
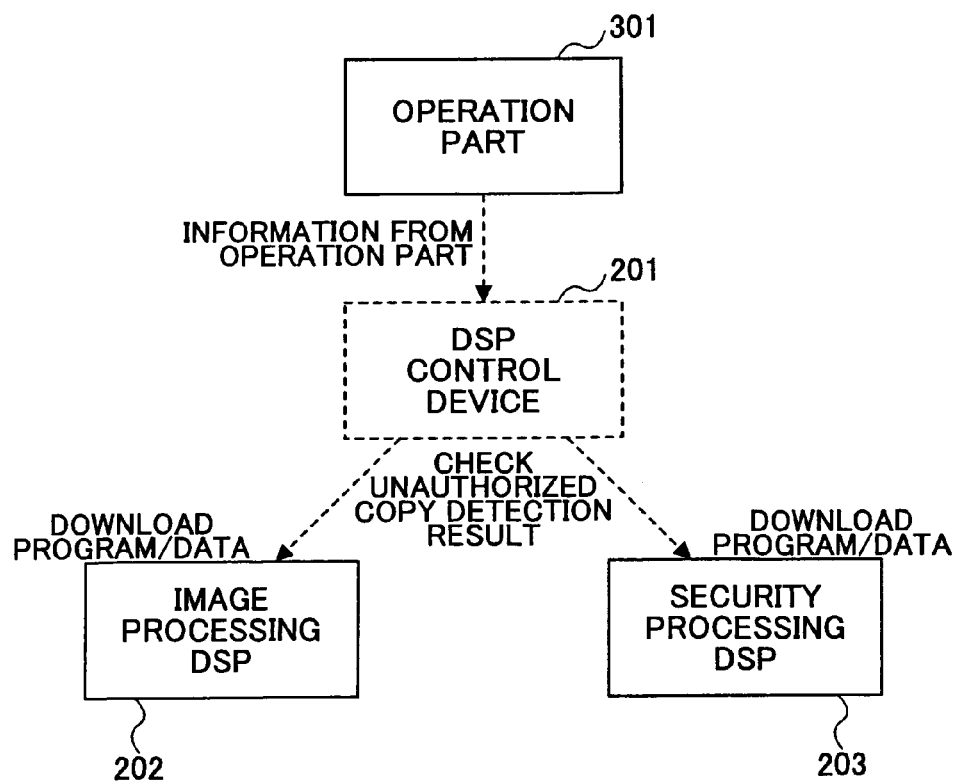

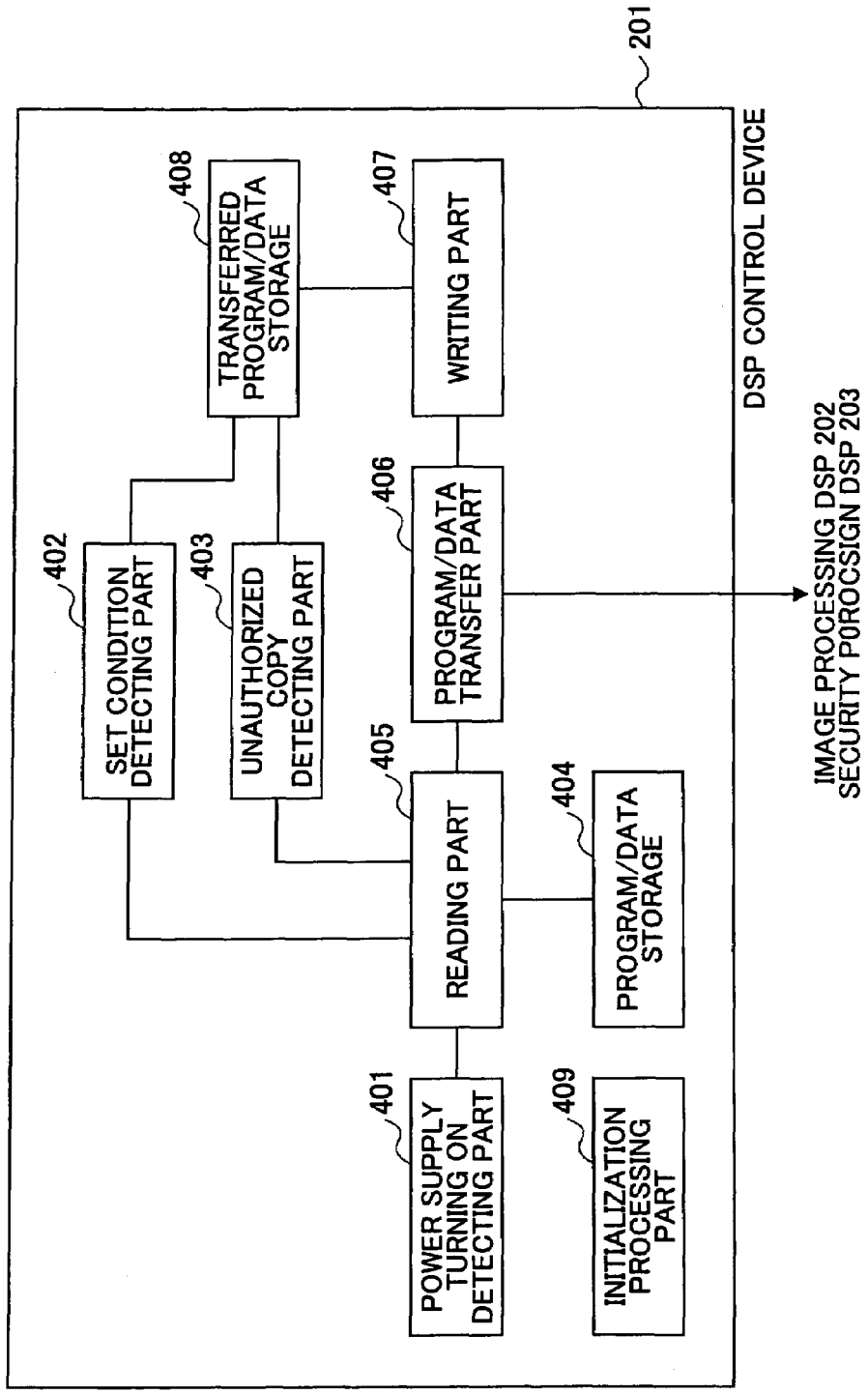

UNAUTHORIZED COPY PREVENTING SYSTEM, UNAUTHORIZED COPY PREVENTING METHOD, UNAUTHORIZED COPY PREVENTING PROGRAM AND COMPUTER-READABLE INFORMATION RECORDING MEDIUM

BACKGROUND OF THE INVENTION

1. Field of the Invention

The present invention relates to an unauthorized copy preventing system, an unauthorized copy preventing method, an unauthorized copy preventing program and a computer readable information recording medium, used for an image forming apparatus such as a digital copier.

2. Description of the Related Art

Recently, image forming apparatuses such as digital copiers have spread widely. As a reason thereof, performance of a digital signal processor (simply abbreviated as a DSP, hereinafter) mounted in such a type of image forming apparatus has been improved, and thereby, high speed and wide varieties of iamge processing can be achieved. Since variable image processing can be achieved as a result of a program or data being appropriately replaced in the DSP, a higher user friendliness is achieved in comparison to a case of applying an ASIC (application specific integrated circuit) (see Japanese Laid-open Patent Applications Nos. 8-274986 and 2001-76125, for example).

However, since image information is processed digitally in the DSP, modification/edition of the image information can be made easily, and, as a result, the image information may be applied for a wrong use (for example, unauthorized copy). Therefore, when the DSP for image processing is mounted in an image forming apparatus, it is necessary to consider a security system suitable for digital image information for the purpose of preventing unauthorized copy of an image.

As the security system in the related art, an art has been proposed in which, a specific pattern prepared for preventing copy is recognized during a process in which a DSP for image processing carries out image processing, and thus, unauthorized copy is avoided (see Japanese Laid-open Patent Application No. 2003-234894, for example).

SUMMARY OF THE INVENTION

However, in the above-described related art, since the DSP carrying out image processing also carries out security processing, an increased load is applied to the DSP, whereby the processing efficiency may degrade.

This problem can be solved by providing a special DSP for carrying out the security processing such as processing for determination as to whether or not an input image is one for which copy is inhibited, in addition to a DSP for image processing. However, there is no example conventionally in which two types of DSPs are mounted in a common image forming apparatus. Generally speaking, when DSPs having different functions are provided, separate systems for controlling the respective DSPs should be provided. When a plurality of different types of DSP control systems are thus provided, the entire system becomes complicated, and also, the entire system becomes large-sized.

The present invention has been devised to solve the above-mentioned problem, and, an object of the present invention is to provide an unauthorized copy preventing system, an unauthorized copy preventing method, an unauthorized copy preventing program and a computer readable information recording medium for controlling two types of DSPs having different functions, i.e., an image processing DSP and a security processing DSP, with a single system, and achieving compactness of a system, improvement of processing and movement of accuracy.

In order to achieve the above-mentioned object, according to a first aspect of the present invention, an unauthorized copy preventing system for preventing unauthorized copy of an image by carrying out predetermined processing on digital image information in an image forming apparatus which carries out image forming includes: an image processing DSP configured to carry out predetermined image processing on an input image; a security processing DSP configured to produce an unauthorized copy determination result for determining whether or not unauthorized copy is being carried out on the image having undergone the image processing by the image processing DSP; and a DSP control device configured to control the image processing DSP and the security processing DSP, and preventing unauthorized copy.

Thereby, it is possible to control the two types of DSPs having different functions, i.e., the image processing DSP and the security processing DSP by a single system, and thus, it is possible to achieve compactness of the entire system and improvement of the processing.

According to a second aspect of the present invention, in the unauthorized copy preventing system according to the above-mentioned first aspect of the present invention, the DSP control device may include: a power supply turning on detecting part detecting power supply turning on of the image forming apparatus; a set condition detecting part detecting setting of a processing condition in the image forming apparatus; an unauthorized copy detecting part detecting, from the unauthorized copy determination result produced by the security processing DSP, whether or not unauthorized copy is being carried out; and a program/data downloading part downloading, based on detection results of the power supply turning on detecting part, the set condition detecting part and the unauthorized copy detecting part, a predetermined program/data in one of the image forming DSP and the security processing DSP.

Thereby, it is possible to control the two types of DSPs having different functions, i.e., the image processing DSP and the security processing DSP by a single system, and thus, it is possible to achieve compactness of the entire system and improvement of the processing.

According to a third aspect of the present invention, in the unauthorized copy preventing system according to the above-mentioned second aspect of the present invention, the program/data downloading part may include: a program/data storage configured to storage therein an image processing program/data for causing the image processing DSP to execute predetermined image processing; and security program/data for causing the security processing DSP to execute predetermined security processing; a reading part reading an optimum program/data from the program/data storage based on detection results of the power supply turning on detecting part, the setting condition detecting part and the unauthorized copy detecting part; and a program/data transferring part transferring the program read out by the reading part to the image processing DSP or the security processing DSP.

Thereby, since optimum programs/data are thus downloaded in the image processing DSP and security processing DSP from the DSP control device, it is possible to control a plurality of operations of the different types of DSPs by the signal control system.

According to a fourth aspect of the present invention, in the unauthorized copy preventing system according to the above-mentioned third aspect of the present invention, the program downloading part may include: a transferred program/data storage configured to temporarily store therein a program/data the same as that transferred by the program/data transferring part; and a writing part writing a program/data the same as that transferred by the program/data transferring part in the transferred program/data storage.

In this configuration, the transferred program/data storage may be searched, and thus, it is possible to recognize the contents of the program/data already downloaded immediately before According to a fifth aspect of the present invention, in the unauthorized copy preventing system according to the above-mentioned fourth aspect of the present invention, when detecting setting of a processing condition of the image forming apparatus, the set condition detecting part may search the transferred program/data storage, and, then, when detecting that there is no optimum program/data in the transferred program/data storage to download in the image processing DSP, the set condition detecting part may cause the program/data downloading part to download an optimum program/data in the image processing DSP or in the security processing DSP.

In this configuration, it is possible to sufficiently respond to even a case where setting of the image processing condition is altered. Furthermore, it is possible to avoid downloading again the same program/data already downloaded immediately before.

According to a sixth aspect of the present invention, in the unauthorized copy preventing system according to any one of the above-mentioned second through fifth aspects of the present invention, when detecting an alteration of an image size change ratio set in the image forming apparatus, the set condition detecting part may cause the program/data downloading part to download difference data corresponding to the altered image size change ratio in the security processing DSP.

In this configuration, even when an image size change ratio is altered in the image forming apparatus, it is possible to carry out detection of unauthorized copy at a high accuracy.

According to a seventh aspect of the present invention, in the unauthorized copy preventing system according to any one of the above-mentioned fourth through sixth aspects of the present invention, when detecting that unauthorized copy is being carried out, the unauthorized copy detecting part may search the transferred program/data storage, and, when detecting that there is no program/data in the transferred program/data storage required for causing the image forming DSP to carry out printing processing for security processing optimum for the image pressing DSP, the unauthorized copy detecting part may cause the program/data downloading part to a download program/data for causing the image processing DSP to carry out printing processing for security processing optimum for the image processing DSP.

In this configuration, it is possible to rapidly carry out processing to prevent unauthorized copy of an image for which copy is inhibited, when such unauthorized copy is detected.

According to an eighth aspect of the present invention, in the unauthorized copy preventing system according to the above-mentioned seventh aspect of the present invention, when detecting that unauthorized copy is being carried out, the unauthorized copy detecting part may cause the program/data downloading part to download, in the image processing DSP, an image processing program/data for causing an image in a condition such that the contents thereof cannot be determined by a human being, to be output.

In this configuration, it is possible to output dummy data or predetermined pattern data, completely different from an input image, when unauthorized copy is detected, and thus, it is possible to prevent unauthorized copy.

According to a ninth aspect of the present invention, in the unauthorized copy preventing system according to any one of the above-mentioned first through eighth aspects of the present invention, the image processing DSP may include: an internal control part controlling predetermined image processing operation based on a program/data downloaded from the DSP control device; a memory part temporarily storing therein a program/data downloaded from the DSP control device; and a path switching part switching a path for selecting image information to sent to the security processing DSP according to control of the internal control part.

In this configuration, efficiency control of the image processing DSP by the DSP control device is achieved.

According to a tenth aspect of the present invention, in the unauthorized copy preventing system according to the above-mentioned ninth aspect of the present invention, the internal control part of the image processing DSP may carry out scanner processing such as black correction, γ correction or alignment registration correction.

In this configuration, it is possible to obtain image information with which it is possible to improve the accuracy of matching processing carried out subsequently in the security processing DSP.

According to an eleventh aspect of the present invention, in the unauthorized copy preventing system according to the above-mentioned tenth aspect of the present invention, the path switching part of the image processing DSP may switch a path when a predetermined number of processing of the scanner processing have been finished, and send image information having thus undergone the scanner processing to the security processing DSP.

In this configuration, it is possible to improve the efficiency in the process generating the unauthorized copy determination result.

According to a twelfth aspect of the present invention, in the unauthorized copy preventing system according to the any one of the above-mentioned first through eleventh aspects of the present invention, the security processing DSP may include: an internal control part control operation of generating the unauthorized copy determination result for determining whether or not unauthorized copy is being carried out based on a program/data downloaded from the DSP control device; and a memory part temporarily storing therein the unauthorized copy determination result generated by the internal control part.

In this configuration, it is possible to achieve efficiency control of the security processing DSP by the DSP control device.

According to a thirteenth aspect of the present invention, in the unauthorized copy preventing system according to the above-mentioned twelfth aspect of the present invention, the internal control part of the security processing DSP may carry out pattern matching on image information having undergone scanner processing carried out by the image processing DSP, and generate the unauthorized copy determination result for determining whether or not unauthorized copy is being carried out.

In this configuration, it is possible to generate the highly accurate unauthorized copy determination result.

According to a fourteenth aspect of the present invention, in the above-mentioned twelfth or thirteenth aspect of the present invention, the unauthorized copy detecting part of the DSP control device may detect, from the unauthorized copy determination result stored in the memory part of the security processing DSP, whether or not unauthorized copy is being carried out.

In this configuration, it is possible to achieve highly accurate detection of unauthorized copy.

According to a fifteenth aspect of the present invention, in any one of the above-mentioned twelfth through fourteenth aspects of the present invention, the DSP control device may further include: an initializing part always monitoring operation of the image processing DSP, and, when detecting a finish of operation of the image processing DSP, carrying out initializing processing on the memory part of the security processing DSP.

In this configuration, it is possible to immediately carry out detection of unauthorized copy carried out for a subsequent input image.

According to a sixteenth aspect of the present invention, in any one of the above-mentioned first through fifteenth aspects of the present invention, the image processing DSP may include a pre-image processing DSP carrying out scanner processing and a post-image processing DSP carrying out printing processing.

In this configuration, it is possible to expect further improvement of the efficiency in the unauthorized copy detecting processing.

According to a seventeenth aspect of the present invention, a method for preventing unauthorized copy of an image in an image forming apparatus carrying out image forming, by performing predetermined processing on digital image information, includes: an initial setting step of carrying out initial setting for preventing unauthorized copy; a special image processing responding step of carrying out predetermined processing for responding to special image processing; a size change ratio alteration responding step of carrying out predetermined processing for responding to size change ratio alteration; a scanner processing step of carrying out scanner processing on an input image; an unauthorized copy determination result generating step of carrying out pattern matching processing on image information already processed in the scanner processing step, and generating an unauthorized copy determination result for determining whether or not unauthorized copy is being carried out; an unauthorized copy detecting step of detecting as to whether or not unauthorized copy is being carried out, with the use of the unauthorized copy determination result generated in the unauthorized copy determination result generating step; and an unauthorized copy preventing step of carrying out predetermined processing for preventing unauthorized copy, based on a detection result of the unauthorized copy detecting step.

In this configuration, it is possible to execute unauthorized copy preventing processing for an image for which copy is inhibited, at a high efficiency and at a high accuracy.

According to an eighteenth aspect of the present invention, in the unauthorized copy preventing method according to the above-mentioned seventeenth aspect of the present invention, the initial setting step may include the step of downloading a main program for image processing and a main program for security processing in an image processing DSP and a security processing DSP included in the image forming apparatus, respectively, when a power supply in the image forming apparatus is turned on.

In this configuration, it is possible to start the unauthorized copy preventing processing rapidly.

According to a nineteenth aspect of the present invention, in the unauthorized copy preventing method according to the above-mentioned seventeenth or eighteenth aspect of the present invention, the special image processing responding step may include the step of, when special image processing is selected in the image forming apparatus, downloading a program/data for image processing for executing the relevant image processing in an image processing DSP included in the image forming apparatus.

In this configuration, even when special image processing is required, it is possible to achieve efficient and accurate unauthorized copy preventing processing.

According to a twentieth aspect of the present invention, in the unauthorized copy preventing method according to any one of the above-mentioned seventeenth through nineteenth aspects of the present invention, the size change ratio alteration responding step may include the step of, when the size change ratio is altered, downloading difference data used for executing image pattern matching processing according to the relevant size change ratio, in a security processing DSP included in the image forming apparatus.

In this configuration, even when size change processing is required for an input image, it is possible to achieve efficient and accurate unauthorized copy preventing processing.

According to a twenty-first aspect of the present invention, in the unauthorized copy preventing method according to any one of the above-mentioned seventeenth through twentieth aspects of the present invention, the unauthorized copy preventing step may include the step of, when unauthorized copy is detected in the unauthorized copy detecting step, downloading a program/data for printing processing for preventing unauthorized copy in an image processing DSP included in the image forming apparatus, and causing it to output an image, completely different from an input image, in a state such that a human being cannot determines the contents thereof; and when no unauthorized copy is detected in the unauthorized copy detecting step, downloading a program/data for normal printing processing in the image processing DSP, and causing it to output an image corresponding to the input image.

In this configuration, when unauthorized copy is detected, dummy data or predetermined pattern data, completely different from an input original image is output, and thus, unauthorized copy is avoided.

According to a twenty-second aspect of the present invention, an unauthorized copy preventing program includes instructions for causing a computer to execute each step of the unauthorized copy preventing method according to any one of the above-mentioned seventeenth through twenty-first aspects of the present invention.

According to a twenty-third aspect of the present invention, a computer readable information recording medium storing therein the unauthorized copy preventing program according to the above-mentioned twenty-second aspect of the present invention.

Thus, in the unauthorized copy preventing system, the unauthorized copy preventing method, the unauthorized copy preventing program or the computer readable information recording medium according to the present invention, it is possible to control two types of DSPs having different functions, i.e., an image processing DSP and a security processing DSP with a single system, and thus to achieve compactness of a system, improvement of the processing and improvement of the accuracy.

BRIEF DESCRIPTION OF THE DRAWINGS

Other objects and further features of the present invention will become more apparent from the following detailed description when read in conjunction with the accompanying drawings:

FIG. 2 is a block diagram showing a general configuration of an unauthorized copy preventing system according to a first embodiment of the present invention;

FIG. 3 generally illustrates operation of the unauthorized copy preventing system according to the first embodiment of the present invention in a condition in which this system is mounted in the image forming apparatus;

FIG. 4 is a block diagram showing a functional configuration of a DSP control device acting as the unauthorized copy preventing system according to the first embodiment of the present invention;

DETAILED DESCRIPTION OF THE PREFERRED EMBODIMENTS

With reference to figures, preferred embodiments of an unauthorized copy preventing system, an unauthorized copy preventing method, an unauthorized copy preventing program and a computer readable information recording medium according to the present invention. An unauthorized copy preventing system, an unauthorized copy preventing method, an unauthorized copy preventing program and a computer readable information recording medium according to the present invention are applicable to an image forming apparatus such as a copier (MF: multi-function peripheral) carrying out image processing based on digital image information.

Figure 1:
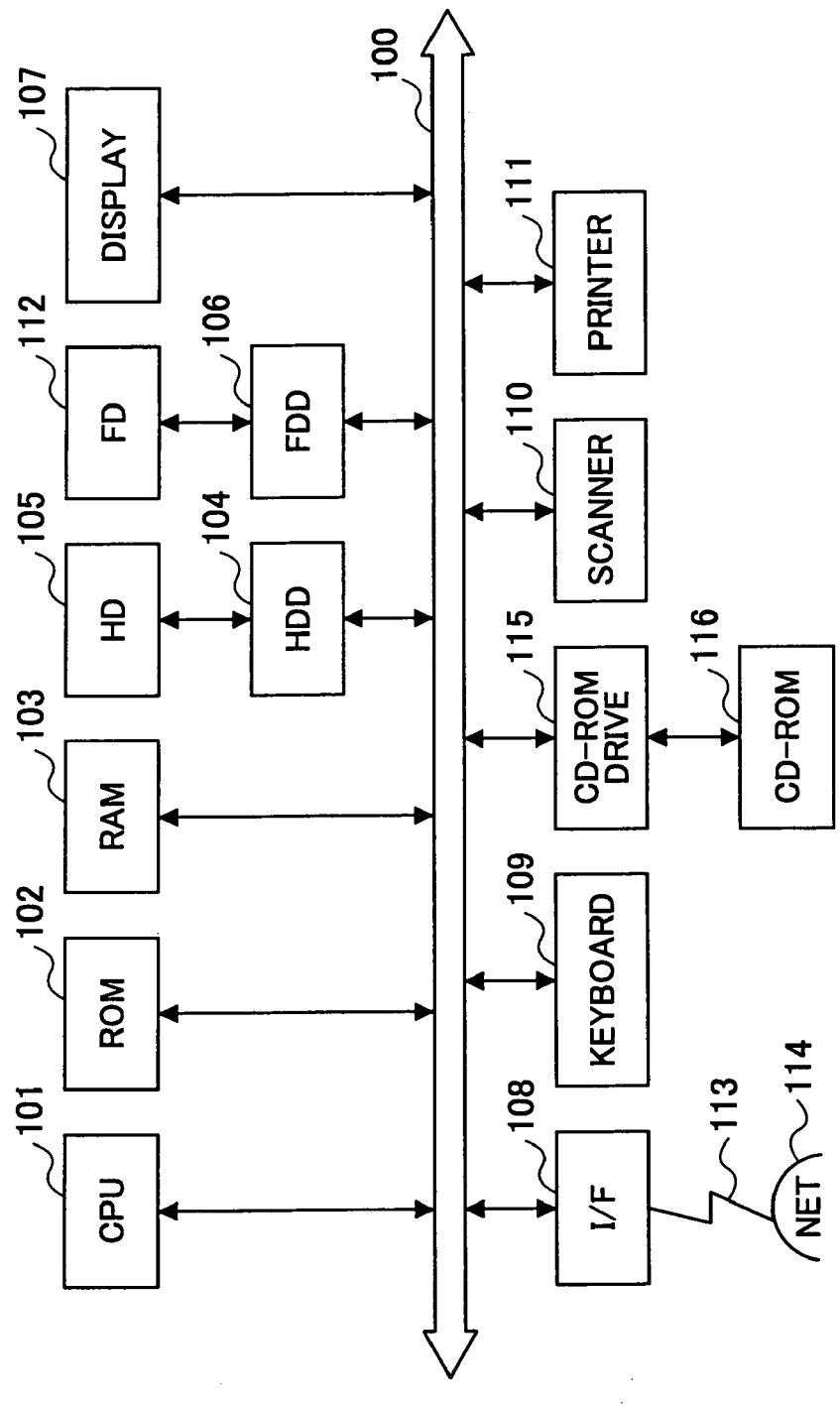
FIG. 1 shows a general configuration of an image forming apparatus in which an unauthorized copy preventing system according to the present invention is mounted.

First, a general configuration of an image forming apparatus in which an unauthorized copy preventing system according to the present invention is mounted is described. FIG. 1 shows a general configuration of this image forming apparatus. The image forming apparatus includes, as shown, a CPU 101, a ROM 102, a RAM 103, a HDD (hard disk drive) 104, a HD (hard disk) 105, a FDD (flexible disk drive) 106, a CD-ROM drive 115, a display device 107, a network board (I/F) 108, a keyboard 109, a scanner 110, and a printer 111, which are connected together by means of a bus 100.

The CPU 101 controls the entirety of the apparatus. In the ROM 102, a basic input/output program is stored. The RAM 103 is used as a work area of the CPU 101. The HDD 104 carries out data read/write control for the HD 105 according to the control of the CPU 101. The HD 105 is used to store therein program/data written according to the control of the HDD 104. The FDD 106 carries out data read/write control for a FD (flexible disk) 112 according to the control of the CPU 101. The FD 112 is detachable, and is used to store therein program/data written according to the control of the FDD 111. The CD-ROM drive 115 carries out data read/write control for a CD-ROM 116 according to the control of the CPU 101. The CD-ROM 116 is detachable, and is used to store therein program/data written according to the control of the CD-ROM drive 115. The display device 107 is sued to display each function executable by the present image forming apparatus, a paper size, a size change ratio or such. The network board 108 is connected with a communication network 114 via a communication cable 113. The keyboard 109 is used to input various types of information required to operate the image forming apparatus. The scanner is used to carry out optical reading of characters or images. The printer 111 is used to output images.

A first embodiment of the present invention is described next.

FIG. 2 is a block diagram showing a general configuration of an unauthorized copy preventing system according to the first embodiment of the present invention. This unauthorized copy preventing system includes a DSP control device 201, an image processing DSP 202 and a security processing DSP 203. The DSP control device 201 controls the image processing DSP 202 and the security processing DSP 203. The DSP control device 201 previously recognizes types of the DSPs to control, and, sends information for image processing to the image processing DSP 202 so as to cause it to carry out predetermined image processing, while sending information for security processing to the security processing DSP 203 and receiving copy permission/inhibition information therefrom. By means of information of the security processing DSP 203, a control of the image processing DSP 202 is switched so that the image processing DSP 202 carries out normal copy or carries out modification so that no information can be actually read out therefrom. Thus, the single DSP control device 201 controls the two types of the DSPs having the different functions including a function of avoiding unauthorized copy of an original image.

Next, general operation of the unauthorized copy preventing system according to the first embodiment of the present invention in a condition in which it is mounted in the image forming apparatus is described. FIG. 3 shows a block diagram illustrating general operation of the unauthorized copy preventing system according to the first embodiment. First, after power supply is turned on in the image forming apparatus, a main program for image processing is downloaded in the image processing DSP 202 from the DSP control device 201. On the other hand, a main program for security processing is downloaded in the security processing DSP 203 from the DSP control device 201.

Then, when a request of a user is input by means of an operation part 301 (including the keyboard 109 and the display device 107 shown in FIG. 1), the DSP control device 210 determines, according to the thus-input information, a program or data to download in the image processing DSP 202 carrying out image processing or in the security processing DSP 203 carrying out security processing accordingly, and downloads the thus-determined program or data in a memory part provided inside of the image processing DSP 202 or in the security processing DSP 203.

After obtaining the thus-downloaded program or data, the image processing DSP 202 carries out image processing based on the above-mentioned main program and the currently downloaded program or data. On the other hand, after obtaining the thus-downloaded program or data, the security processing DSP 203 carries out pattern matching processing on an input image based on the above-mentioned main program and the currently downloaded program or data, and determines whether or not copy of the input image corresponds to unauthorized copy.

Next, a function configuration of the DSP control device 201 is described. FIG. 4 is a block diagram showing a functional configuration of the DSP control device 201 included in the unauthorized copy preventing system according to the first embodiment of the present invention. As shown, the DSP control device 201 includes a power supply turning on detecting part 401, a set condition detecting part 402, an unauthorized copy detecting part 403, a program/data storage 404, a reading part 405, a program data transfer part 406, a writing part 407, a transferred program/data storage 408, and an initialization processing part 409.

The power supply turning on detecting part 401 detects turning on of power supply in the image forming apparatus in which the unauthorized copy preventing system is mounted. The set condition detecting part 402 detects various conditions set in the image forming apparatus by means of the operation part 301 by a user. The unauthorized copy detecting part 403 detects whether or not unauthorized copy is being carried out, based on a processing result of the security processing DSP 203. In the program/data storage 404, programs/data used for control the image processing DSP 202 and programs/data used for controlling the security processing DSP 203 are stored.

The reading part 405 reads the main program for controlling the image processing DSP 202 and the main program for controlling the security processing DSP 203 from the program/data size 404 when turning on of power supply in the image forming apparatus is detected by the power supply turning on detecting part 401. Further, the reading part 405 reads a program/data used by the set condition detecting part 402 for executing processing according to a condition set by means of the operation part 301. Further, the reading part 405 reads a program/data to transfer to the image processing DSP 202 for executing subsequent processing to be carried out when unauthorized copy is detected in the unauthorized copy detecting part 403.

The program/data transfer part 406 downloads a program/data read from the program/data storage 404 read by the reading part 405, in the relevant DSP. The program/data transfer part 406 also carries out address setting for the memory part (described later) of each DSP in which the thus-downloaded program/data is stored. The writing part 407 stores, in the transferred program/data storage 408, the program/data downloaded in the image processing DSP 202 or the security processing DSP 203 by the program/data transfer part 406. The downloaded program/data thus stored in the transferred program/data storage 408 is held there until a program/data is downloaded next.

When detecting condition setting by means of the operation part 301 by the user, the set condition detecting part 402 detects whether or not a program/data for carrying out processing which meets the relevant condition exists in the transferred program/data storage 408. As mentioned above, once downloaded program/data is held in the transferred program/data storage 408 temporarily until a program/data is downloaded for carrying out other processing subsequently. Accordingly, when the program/data required for carrying out the processing satisfying the relevant condition already exists in the transferred program/data storage 408, it can be determined that the current processing coincides with the preceding processing. The set condition detecting part 402 sends an instruction to the reading part 405 to read a program/data required to carry out the processing satisfying the relevant condition only when the condition setting different from the preceding one has been carried out currently on the operation part 301.

The initialization processing part 409 carries out initialization processing on the security processing DSP 203 (described later) when detecting a finish of operation of the image processing DSP 202.

Figure 5:
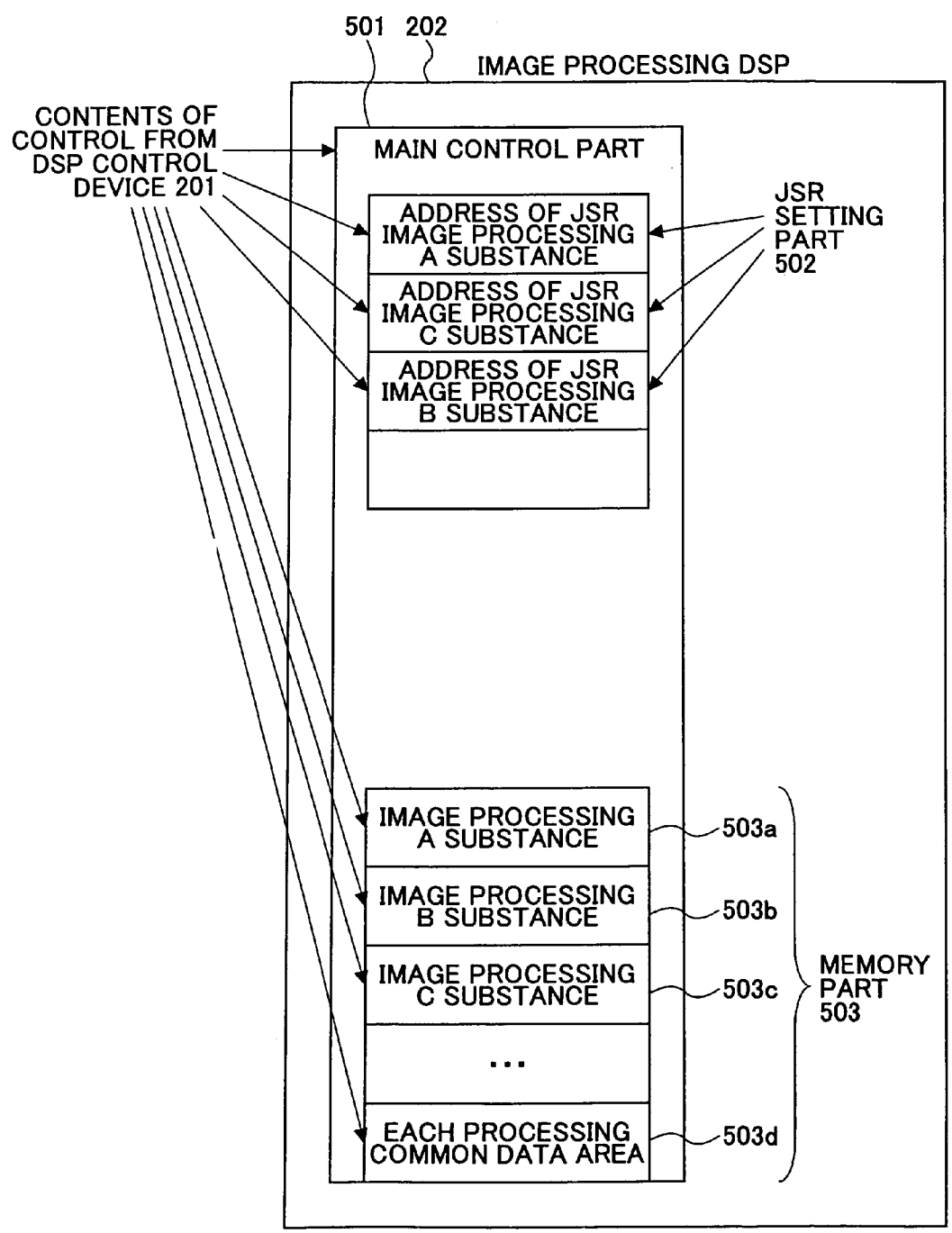
FIG. 5 is a block diagram showing a general functional configuration of an image processing DSP.

A functional configuration of the image processing DSP 202 is generally described next. FIG. 5 is a block diagram illustrating a general functional configuration of the image processing DSP 202. The image processing DSP 202 includes a main control part 501. The main control part 501 includes a JSR (jump to subroutine) setting part 502 and a memory part 503 for storing a program/data transferred from the DSP control device 201.

The main control part 501 controls processing of writing/reading of a program/data to/from the memory part 503 in response to a program/data writing/reading setting made by the DSP control device 201. The image processing DSP 202 cannot control image processing unless the main control part 501 functions, and therefore, the main program is downloaded in the image processing DSP 202 from the DSP control device 201 upon turning on of power supply in the image forming apparatus. Setting of downloading of the main program is not responsive to reading/writing operation carried out on the memory part 503 by the main control part 501. Therefore, boot setting which is the downloading setting of the main program can be carried out according to a predetermined protocol previously set.

The JSR setting part 502 carries out path switching for selecting image information to send to the security processing DSP 203 according to program/data writing/reading processing instruction sent from the main control part 501.

After the main program is downloaded from the DSP control device 201, each image processing information (an image processing A substance 503a, an image processing B substance 503b, or an image processing C substance 503c) is stored at an address of the memory part 503 set by the program/data transfer part 406 of the DSP control device 201, in the image processing DSP 202. Further, in an each processing common data area 503d which is referred to when each image processing is executed, data values are stored. Further, the addresses of the respective ones of image processing and an order thereof in which JSR setting is carried out are also set by the program/data transfer part 406. The main control part 501 carries out image processing according to the order thus set.

In the example shown in FIG. 5, setting is made in the JSR setting part 502 for an address of the image processing A substance, an address of the image processing C substance and an address of the image processing B substance in the stated order, and as a result, an image processing path is determined in the order of A, C and B, and the image processing is carried out according to the thus-determined image processing path. Thus, the DSP control device 201 controls the image processing path of the image processing DSP 202.

The image processing program downloaded in the image processing DSP 202 from the DSP control device 201 previously includes a program for transferring image information already processed to the security processing DSP 203 even on the way of the image processing (scanner processing) in the image processing DSP 202. As described above, the DSP control device 201 can freely control the JSR setting part 502 of the image processing DSP 202, and can switch the image processing path. Accordingly, by embedding a program of transferring image information to the security processing DSP 203 in the image processing path at a position at which the becomes in an optimum state for being subject to the security check, the security processing in the security processing DSP 203 can be carried out easily, and also, erroneous operation can be avoided.

Figure 6:
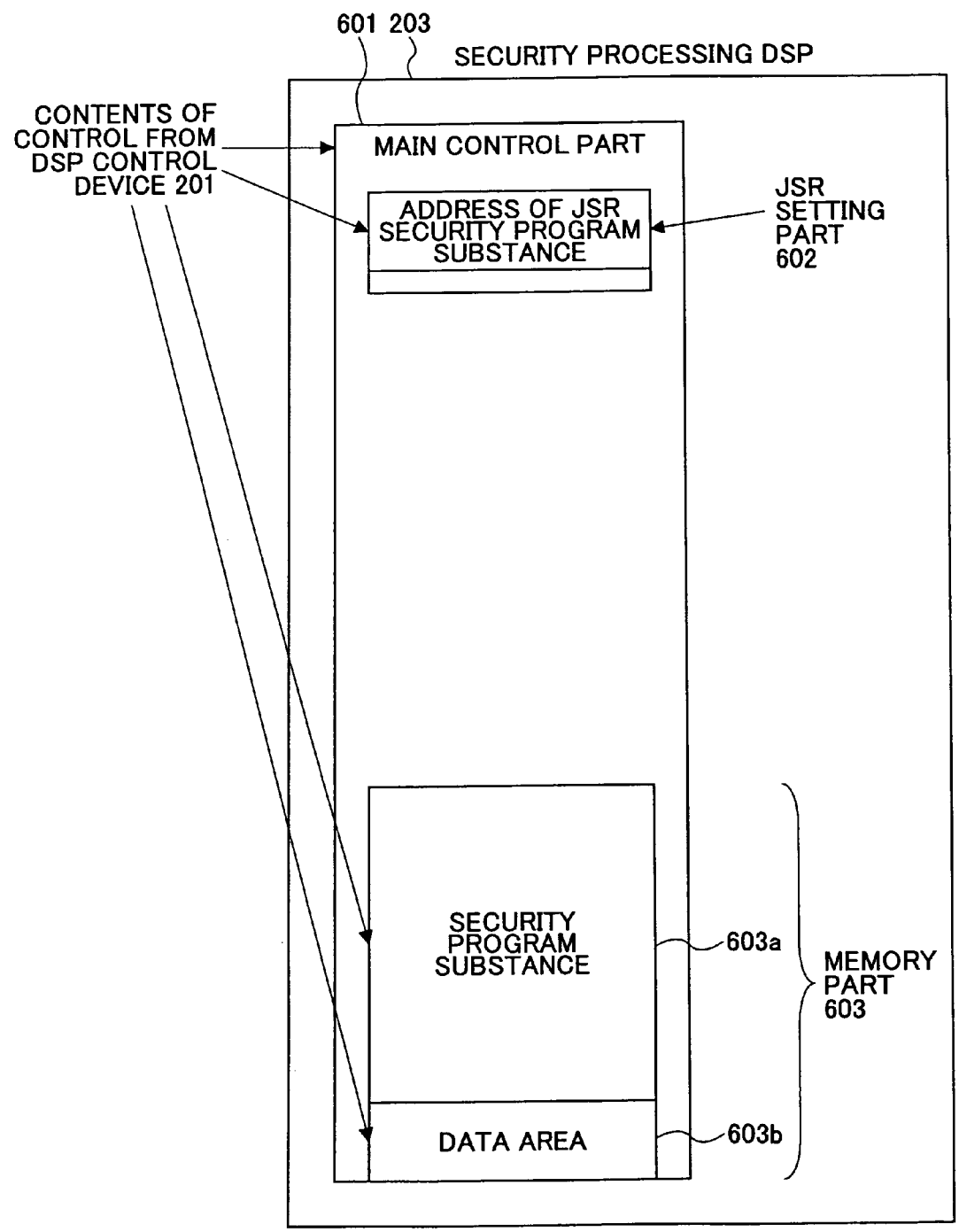
FIG. 6 is a block diagram showing a general functional configuration of a security processing DSP.

Next, a general functional configuration of the security processing DSP 203 is described. FIG. 6 is a block diagram illustrating a general functional configuration of the security processing DSP 203. As shown, the security processing DSP 203 includes a main control part 601. The main control part 601 includes a JSR setting part 602 and a memory part 603 for storing a program/data transferred from the DSP control device 201.

The main control part 601 controls writing/reading of a program/data to/from the memory part 603 in response to a program/data writing/reading instruction given by the DSP control device 201. Also this security processing DSP 203 cannot control the security processing when the main control part 602 does not function. Therefore, upon turning on of power supply in the image forming apparatus, the main program is downloaded in the security processing DSP 203 from the DSP control device 201. Setting of downloading of the main program is not responsive to reading/writing operation on the memory part 603 carried out by the main control part 601. Therefore, boot setting which is the downloading setting of the main program can be carried out according to a predetermined protocol previously set. Unlike the image processing DSP 202, the security processing DSP 203 has only a security program substance 603a. Therefore, a path for the security processing is fixed according to this single program. As a result, no path switching is carried out by the JSR setting part 602.

Figure 7:
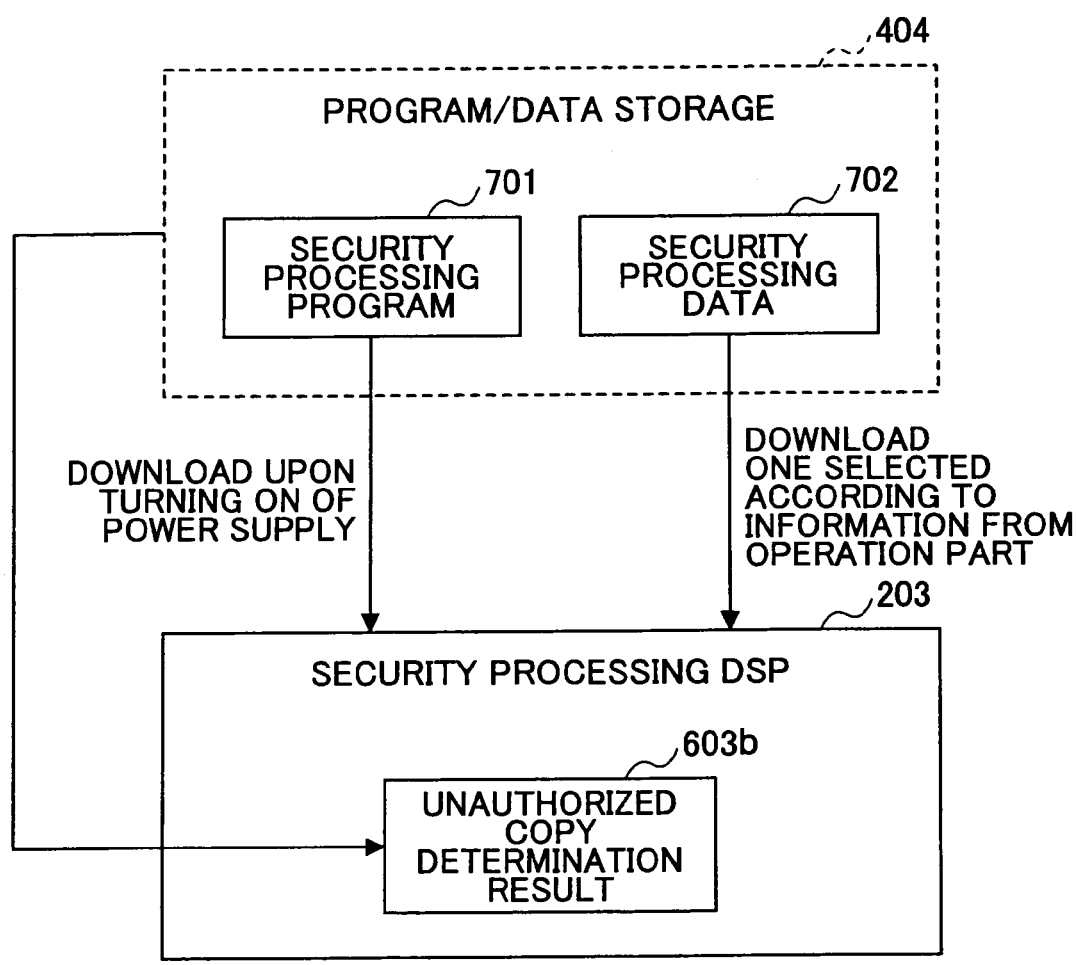
FIG. 7 illustrates the contents of processing carried out by the security processing DSP.

With reference to FIG. 7, the contents of processing of the security processing DSP 203 are described next. The DSP control device 201 holds a security processing program 701 and security processing data 702 in the program/data storage 404. When power supply is turned on in the image forming apparatus, the security processing program 701 is downloaded in the security processing DSP 203 from the program/data storage 404. The security processing program 701 has an algorithm used for carrying out pattern matching processing on an image having undergone scanner processing in the image processing DSP 202. Since the security processing program 701 includes only an execution session and a substance of the program, alteration thereof is not needed. Accordingly, downloading of the security processing program 701 should be carried out only upon turning on of power supply in the image forming apparatus.

When a size change ratio for an image to be copied is set by means of the operation part 301 of the image forming apparatus, the security processing data 702 is downloaded in the security processing DSP 203 from the DSP control device 201. The security processing data 702 provides difference data required for the security processing program 701 for the purpose such that the pattern matching processing suitable to an image in the thus-set size change ratio can be carried out. Accordingly, only by downloading the appropriate security processing data 702, the security processing program 701 can be used to deal with an image in any size change ratio.

After carrying out the pattern matching processing on the image, the security processing DSP 203 stores a thus-generated unauthorized copy determination result in a data area 603b of the memory part 603 (see FIG. 6). The unauthorized copy determination result is set in such a manner that this result indicates OK when the copy has no problem, while the same indicates NG when the relevant copy corresponds to unauthorized one, as a result of the above-mentioned pattern matching processing.

After the processing in the security processing DSP 203 is finished, the DSP control device 201 reads the value of the unauthorized copy determination result from the memory part 603 of the security processing DSP 203, detects whether or not unauthorized copy is being carried out (i.e., whether or not the input original image corresponds to one for which copy is allowed), and determines processing to carry out subsequently. Actually, the unauthorized copy detecting part 403 of the DSP control device 201 reads the value of the unauthorized copy determination result and determines whether or not unauthorized copy is being carried out.

Figure 8:
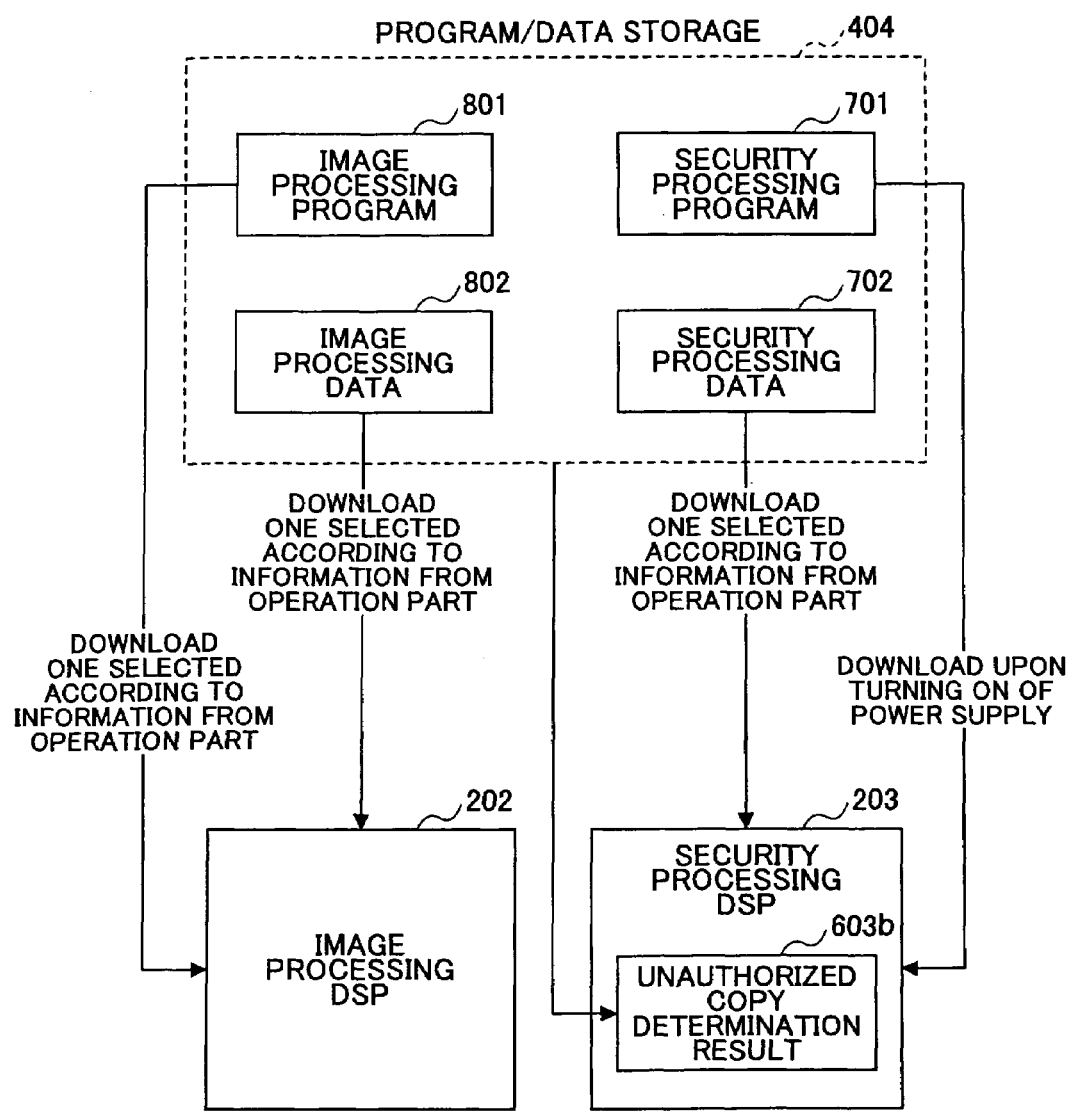
FIG. 8 illustrates operation of the unauthorized copy preventing system according to the first embodiment of the present invention.

Next, operation of the unauthorized copy preventing system according to the first embodiment is described. FIG. 8 illustrates operation of the unauthorized copy preventing system. First, when the power supply turning on detecting part 401 of the DSP control device 201 detects turning on of the image forming apparatus, the reading part 405 reads an image processing program 801 and the security processing program 701 from the program/data storage 404. The thus-read image processing program 801 and security processing program 701 are downloaded by the program/data transfer part 406, and are stored in predetermined addresses of the respective memory parts 503 and 603 of the image processing DSP 202 and the security processing DSP 203, respectively.

Next, when the set condition detecting part 402 detects that a special image processing condition such as character priority, photograph priority or such has been set by means of the operation part 301 by the user, the reading part 405 reads the image processing program 801 and image processing data suitable to the relevant processing condition thus set, from the program/data storage 404. The image processing program 801 and the image processing data 801 thus read are downloaded by the program/data transfer part 406, and are stored in predetermined addresses of the memory part 503 of the image processing DSP 202. Simultaneously, the same image processing program 801 and the image processing data 802 are stored in the transferred program/data storage 408 by means of the writing part 407. On the other hand, when no special image processing is set by means of the operation part 301 (that is, normal image processing), the above-described processing is not carried out since the main program downloaded upon turning on of power supply alone can deal therewith.

Further, when the set condition detecting part 402 detects that alteration of the image size change ratio has been carried out on the operation part 301 by the user, the reading part 405 reads the security processing data (difference data) 702 with which the pattern matching processing of an image responsive to the relevant image size change ratio can be carried out properly, from the program/data storage 404. The security processing data 701 is needed because, since an image to process changes according to an alteration in the image size change ratio, patterns used for the pattern matching changes accordingly. The thus-read security processing data 702 is downloaded by the program/data transfer part 406, and is stored in a predetermined address of the memory part 603 of the security processing DSP 203. Simultaneously, the same security processing data 702 is stored in the transferred program/data storage 408 by the writing part 407. On the other hand, when no setting alteration operation is carried out on the operation part 301, the image size change ratio is set as being 100% (default) and as a result, the above-described processing is not carried out.

It is noted that, when the set condition detecting part 402 detects that alternation of set condition has been made as a result of the operation part 301 being operated by the user, the set condition detecting part 402 first determines whether or not the program/data required to carry out the relevant set condition have been, already stored in the transferred program/data storage 408. Then, when the relevant program/data has not been stored in the transferred program/data storage 408, reading of the same from the program/data storage 404 is started. As a result, it is possible to avoid a program/data same as that already downloaded immediately before from being downloaded again uselessly.

Next, the image processing DSP 202 carries out predetermined image processing (scanner processing) on the input image based on the main program and the newly downloaded program/data. Then, for the image thus having undergone the predetermined image processing, the image pattern matching processing is carried out by the security processing DSP 203. As a result of the pattern matching, the security processing DSP 203 generates the unauthorized copy determination result (for example, a value indicating OK or NG), and stores the same in the data area 603b of the memory part 603.

The unauthorized copy detecting part 403 of the DSP control device 201 is configured to be able to read various sorts of data stored in the memory part 603 of the security processing DSP 203. After power supply is turned on in the image forming apparatus, the unauthorized copy detecting part 403 monitors for a timing at which the unauthorized copy determination is carried out by the security processing DSP 202 since the setting was made on the operation part 301, and, reads the value of the unauthorized copy determination result from the data area 603b of the memory part 603 of the security processing DSP 203. The unauthorized copy detecting part 403 determines, from the thus-read value, whether or not unauthorized copy is being carried out.

When the unauthorized copy detecting part 403 detects from the read value that unauthorized copy is being carried out, the reading part 405 reads an image processing program 801 or image processing data 802 required to prevent the input image from being actually copied by the image processing DSP 202, from the program/data storage 404. The thus-read image processing program 801 or image processing data 802 is downloaded by the program/data transfer part 406 and is stored in a predetermined address of the memory part 503 of the image processing DSP 202. Then, the image processing DSP 202 carries out predetermined image processing (printing processing) on the input image based on the thus-newly-downloaded image processing program 801 or image processing data 802, and outputs an image. In this case, by a function of the thus-applied image processing program 801 or image processing data 802, the thus-output image is completely different from the original image. That is, the output image is in a condition such that a human being cannot determine the contents (the image made by dummy data). Alternately, it is also possible to output no image, and thus, a blank paper may be output. Further alternately, it is possible to carry out no actual image outputting, or cease the image output processing on the way, for the same purpose of avoiding actual unauthorized copy.

On the other hand, when the unauthorized copy detecting part 403 determines from the read value that no unauthorized copy is being carried out, the above-described program/data required for a case of detecting unauthorized copy is not needed. Accordingly, an image processing program 801 or image processing data 802 required to allow normal image printing processing carried out by the image processing DSP 202 is read from the program/data storage 404 by the reading part 405. The image processing program 801 or image processing data 802 thus read is downloaded by the program/data transfer part 406, and is stored in a predetermined address of the memory part 503 of the image processing DSP 202. Then, the image processing DSP 202 carries out normal printing of the input image based on the thus-downloaded image processing program 801 or image processing data 802 accordingly, and outputs an image according to the setting made on the operation part 301 by the user.

In the unauthorized copy preventing system according to the first embodiment, the initialization processing part 409 of the DSP control device 201 recognizes an operation state of the image processing DSP 202 to control, in timing in which a request is obtained from the operation part 301. Then, when detecting a finish of image processing in the image processing DSP 202, the initialization processing part 409 rewrites the unauthorized copy determination result stored in the data area 603b of the memory part 603 of the security processing DSP 203 and initializes it, in this timing. After that, the DSP control device 201 enters a state of waiting for an input provided from the operation part 301, and thus, can carry out subsequent copy operation without being affected by the unauthorized copy determination result already processed precedingly.

Thus, in the unauthorized copy preventing system according to the first embodiment of the present invention, because of the above-described configuration, it is possible to control the different types of DSPs, such as the image processing DSP for carrying out image processing and the security processing DSP for avoiding unauthorized copy, by means of the single DSP control device. In contrast thereto, according to the related art, a different control system is required for a different type of DSP. Thus, according to the present invention. it is possible to greatly miniaturize the unauthorized copy preventing system. Furthermore, since the two different types of DSPs can be controlled by the single control device, unlike the related art in which the same number of control systems as the number of the different types of DSPs to be controlled are required, data communication between respective control systems are not needed. As a result, it is possible to improve the processing efficiency.

Figure 9:
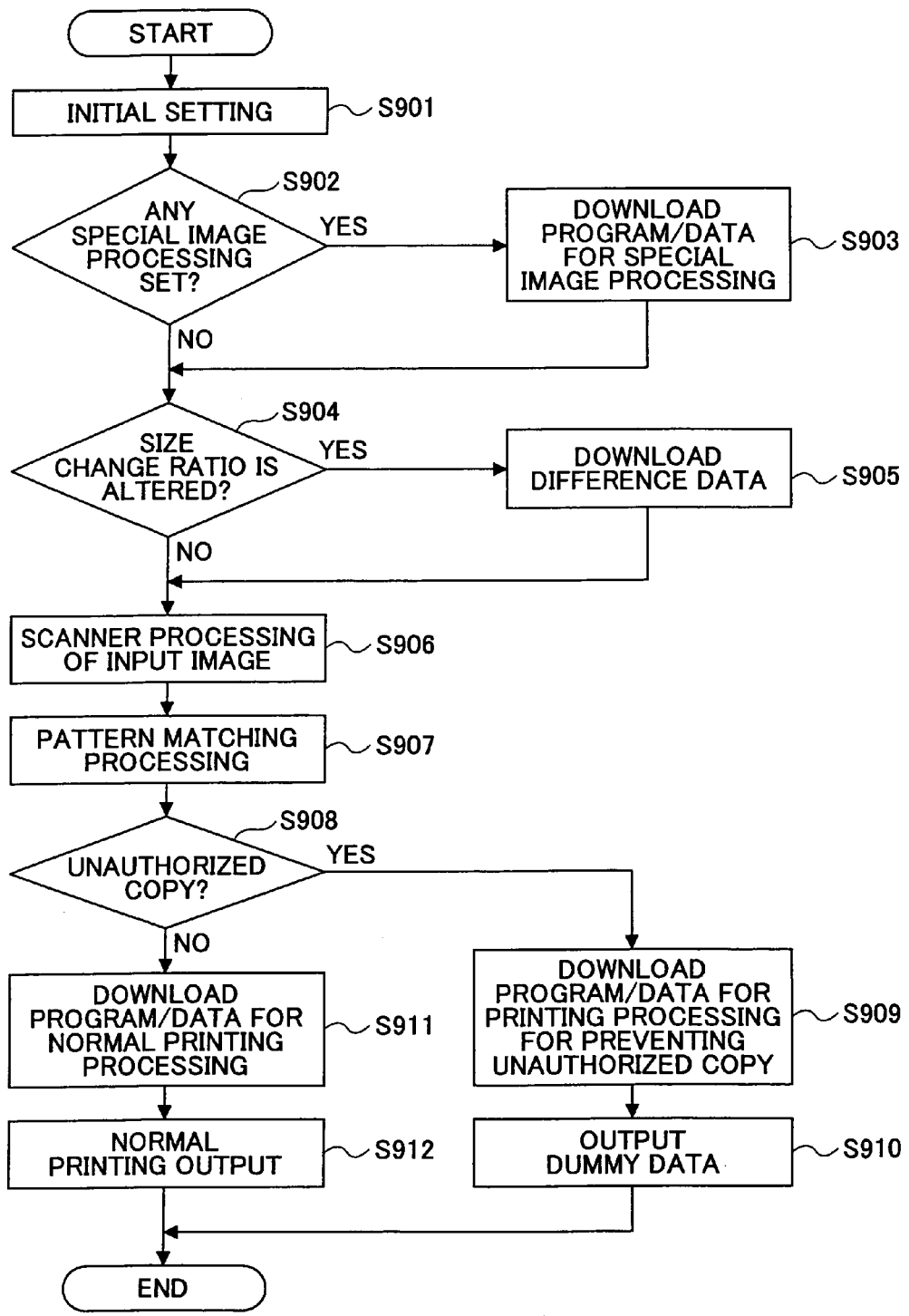
FIG. 9 shows a flow chart of a procedure of unauthorized copy preventing processing according to the first embodiment of the present invention.

A procedure of unauthorized copy preventing processing with the use of the unauthorized copy preventing system according to the first embodiment of the present invention is described next. FIG. 9 is a flow chart showing the procedure of the unauthorized copy preventing processing.

First, initial setting is carried out in Step S901. Specifically, when turning on of power supply in the image forming apparatus is detected, the image processing main program and the security processing main program are downloaded in the image processing DSP 202 and the security processing DSP 203, respectively, from the DSP control device 201.

Then, it is determined whether or not the set condition detecting part 402 detects that special image processing (for example, charter priority, photograph priority or such) has been set on the operation part 301, in Step S902. When a fact that setting for special image processing has been carried out is detected (Yes in Step S902), after a program/data required for carrying out thus-set special image processing is downloaded in the image processing DSP 202 (Step S903), Step S904 is carried out. On the other hand, when a fact that setting for special image processing has been made is not detected (No in Step S902), Step S904 is carried out directly without carrying out Step S903.

Then, the set condition detecting part 402 detects whether or not alteration of the image size change ratio has been made on the operation part 301 (Step S904). In the first embodiment, it is assumed that the image size change ratio is set as being 100% (default value) normally. When it is determined that alteration of the image size change ratio has been made (Yes in Step S904), Step S906 is carried out after difference data required for allowing the security processing DSP 203 to carry out image pattern matching processing responsive to the thus-set image size change ratio is downloaded in the security processing DSP 203 (Step S905). On the other hand, when no detection is made for a fact that alteration of the image size change ratio has been made (No in Step S904), Step S906 is carried out directly without carrying out Step S905.

Next, the image processing DSP 202 carries out scanning processing on an input image (Step S906) based on the program/data downloaded in Step S903 (and Step S905). Then, the security processing DSP 203 determines whether or not the relevant image, thus processed in Step S906, corresponds to unauthorized copy, based on the program/data downloaded in Step S903 (and Step S905) by means of the pattern matching processing, and stores the thus-obtained unauthorized copy determination result in the memory part 603 of the security processing DSP 203 (Step S907).

Next, the unauthorized copy detecting part 403 of the DSP control device 201 reads the unauthorized copy determination result stored in Step S907, and, detects whether or not unauthorized copy is being carried out (Step S908). When it is detected that unauthorized copy is being carried out (Yes in Step S908), a printing processing program/data required for carrying out processing for avoiding unauthorized copy is downloaded in the image processing DSP 203 from the DSP control device 201 (Step S909). Then, based on the program/data downloaded in Step S909, the image processing DSP 202 outputs an image in a condition such that a human being cannot recognize the contents (dummy data) accordingly, which is completely different from the input original image (Step S910). On the other hand, when no detection is made for a fact that unauthorized copy is being carried out (No in Step S908), a program/data required for carrying out normal printing processing is downloaded in the image processing DSP 202 from the DSP control device 201 (Step S911). Then, the image processing DSP 202 carries out normal printing processing accordingly based on the program/data downloaded in Step S911, in Step S912.

By carrying out the above-described processing, it is possible to carry out processing for avoiding unauthorized copy efficiently at a high accuracy.

Figure 10:
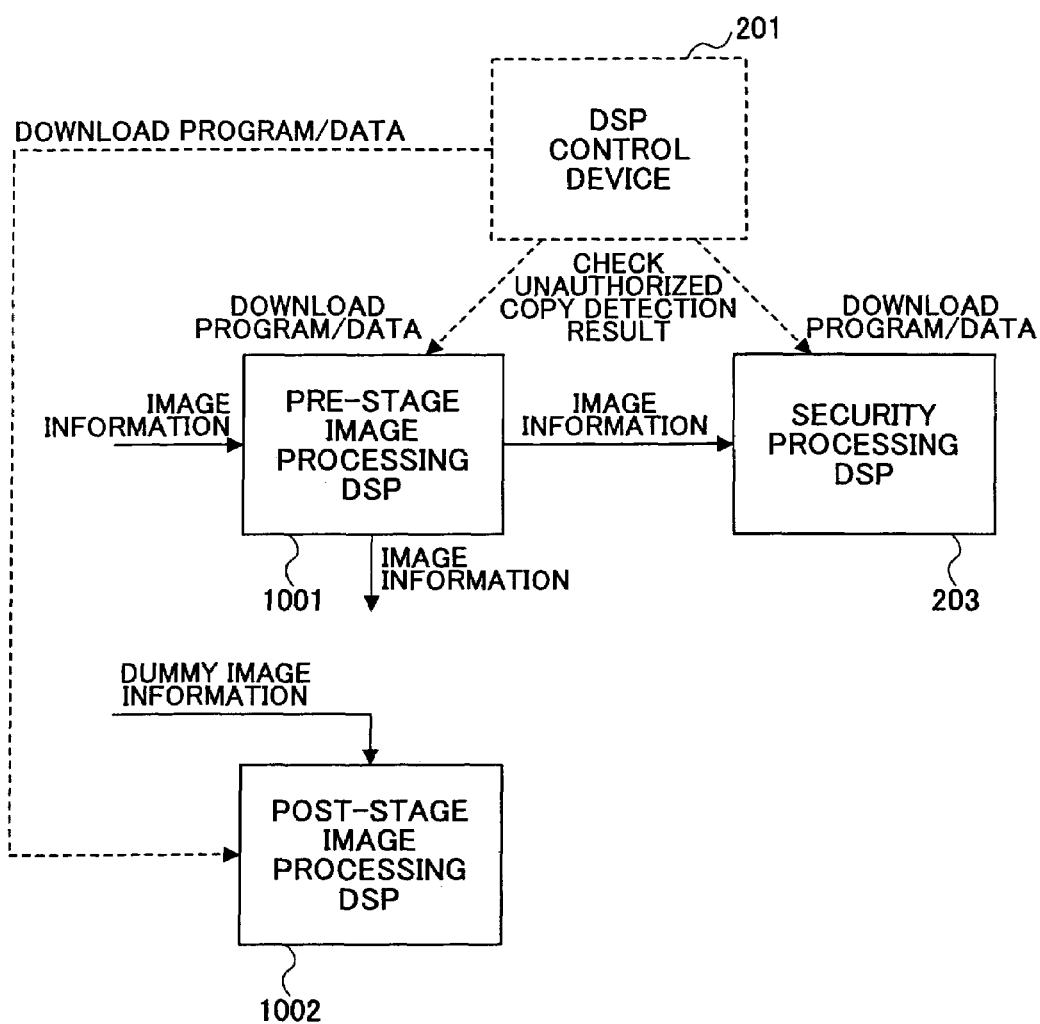
FIG. 10 is a block diagram showing a general configuration of an unauthorized copy preventing system according to a second embodiment of the present invention.

An unauthorized copy preventing system according to a second embodiment of the present invention is described next. FIG. 10 is a block diagram showing a general configuration of the unauthorized copy preventing system according to the second embodiment. As shown, in this unauthorized copy preventing system according to the second embodiment, the image processing DSP 202 in the first embodiment includes a pre-stage image processing DSP 1001 carrying out scanner processing and a post-stage image processing DSP 1002 carrying out printing processing. The other part is the same as that of the first embodiment. Description will now be made mainly for differences from the first embodiment.

The pre-stage image processing DSP 1001 carried out predetermined image processing on an input image based on the main program and the program/data newly downloaded. Then, the pattern matching processing is carried out on the image thus having undergone the predetermined image processing, by the security processing DSP 203. The program/data required for the pattern matching processing is previously downloaded from the DSP control device 201 as described above for the first embodiment. As a result of the pattern matching processing, the security processing DSP 203 generates and stores a thus-produced unauthorized copy determination result (for example, value indicating OK or NG) in a predetermined address of the memory part 603.

The unauthorized copy detecting part 403 of the DSP control device 201 can read various sorts of data stored in the memory part 603 of the security processing DSP 203. After turning on of power supply in the image forming apparatus, the unauthorized copy detecting part 403 monitors for a timing at which the unauthorized copy determination is carried out by the security processing DSP 203 since the setting was made on the operation part 301, and, reads the value of the unauthorized copy determination result from the data area 603b of the memory part 603 of the security processing DSP 203. The unauthorized copy detecting part 403 determines, from the thus-read value, whether or not unauthorized copy is being carried out.

When the unauthorized copy detecting part 403 detects from the read value that unauthorized copy is being carried out, the reading part 405 reads an image processing program or image processing data required to prevent the input image from being actually copied by the post-stage image processing DSP 1002, from the program/data storage 404. The thus-read image processing program or image processing data is downloaded by the program/data transfer part 406 and is stored in a predetermined address of a memory part of the post-stage image processing DSP 1002. Then, the post-stage image processing DSP 1002 carries out predetermined image processing (printing processing) on the input image based on the thus-newly-downloaded image processing program or image processing data, and outputs an image. In this case, by a function of the thus-applied image processing program or image processing data newly downloaded, the thus-output image is completely different from the original image. That is, the output image is in a condition such that a human being cannot determine contents (the image made by dummy data). Alternately, it is also possible to output no image, and thus, a blank paper may be output. Further alternately, it is possible to carry out no actual image outputting, or cease the image output processing on the way, for the same purpose.

On the other hand, when the unauthorized copy detecting part 403 determines from the read value that no unauthorized copy is being carried out, the above-described program/data required for a case of detecting possible unauthorized copy is not needed. Accordingly, an image processing program or image processing data required to allow normal priority processing to be carried out by the post-stage image processing DSP 1002 is read from the program/data storage 404 by the reading part 405. The image processing program or image processing data thus read is downloaded by the program/data transfer part 406, and is stored in a predetermined address of the memory part of the post-stage image processing DSP 1002. Then, the post-stage image processing DSP 1002 carries out normal printing of the input image based on the thus-downloaded image processing program or image processing data, and outputs an image according to the setting made on the operation part 301.

Figure 11:
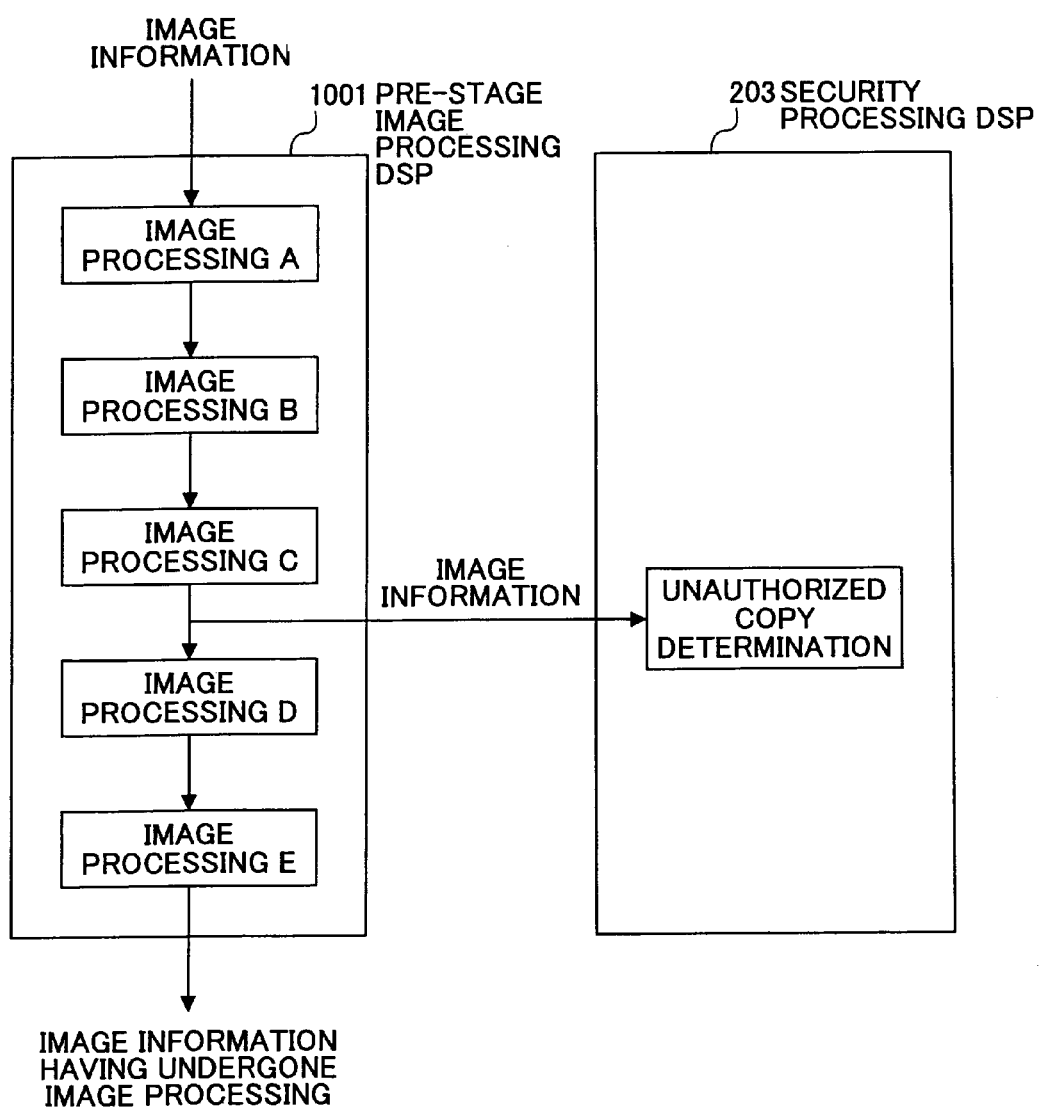
FIG. 11 illustrates image information processing carried out between the image processing DSP and the security processing DSP.

Image information processing carried out between the pre-stage image processing DSP 1001 and the security processing DSP 203 is described next. FIG. 11 illustrates the image information processing. The pre-stage image processing DSP 1001 carries out various sorts of scanner processing (referred to as image processing A through E in FIG. 11) on the input image. If the pattern matching processing on the image having undergone all the image processing A through E is carried out by the security processing DSP 203 for determining for possible unauthorized copy, it is possible to find possible unauthorized copy at a high accuracy. However, a time is required for completing the entire processing if the pattern matching is carried out only after all the scanner processing, i.e., the image processing A through E is finished. Furthermore, there is a case where it is possible to achieve the pattern matching processing at a considerably high accuracy even with the image which has not undergone all the scanner processing. The above-mentioned scanner processing includes, for example, black correction, shading correction, γ correction, position alignment registration correction or such.

Therefore, according to the second embodiment, before all the scanner processing is finished in the pre-stage image processing DSP 1001, and, at a time at which several sorts of but not all processing has been finished, image information thus obtained is sent to the security processing DSP 203. Then, on the thus-sent image information, image pattern matching processing is carried out there, as shown in FIG. 11. As a result, it is possible to greatly improve the processing efficiency for determining for possible unauthorized copy.

Thus, in the unauthorized copy preventing system according to the second embodiment of the present invention, the image processing DSP is separated into the two stages, and thus, a size of the system increases in comparison to the first embodiment. However, since it is possible to improve the efficiency of the image pattern matching, it is possible to shorten a processing time required for detecting possible unauthorized copy.

Figure 12:
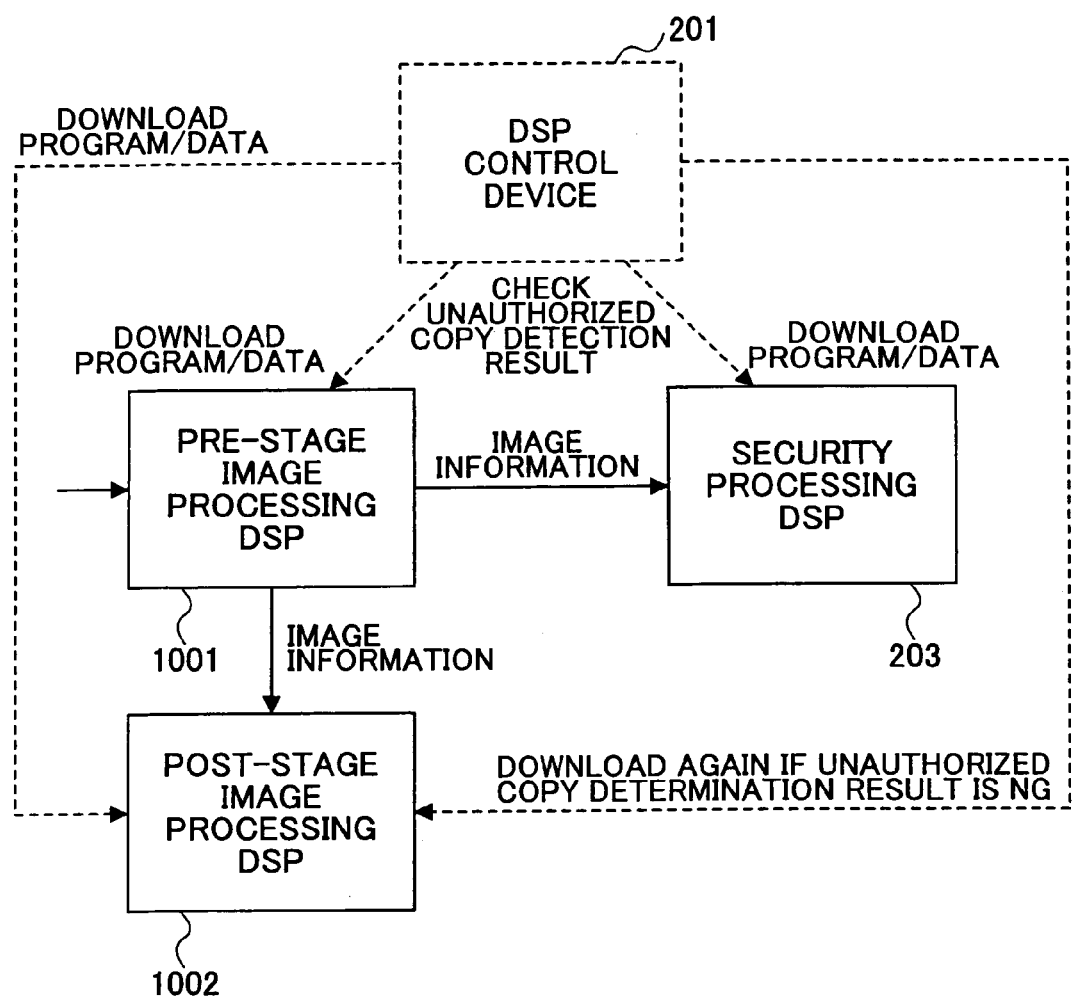
FIG. 12 is a block diagram showing a general configuration of an unauthorized copy preventing system according to a third embodiment of the present invention.

An unauthorized copy preventing system according to a third embodiment of the present invention is described next. FIG. 12 is a block diagram showing a general configuration of the unauthorized copy preventing system according to the third embodiment. The configuration of this unauthorized copy preventing system is the same as that of the second embodiment. However, a type of a program/data to be downloaded and processing thereof are different from those of the second embodiment. Description will now be made mainly for differences from the second embodiment.

At the same time at which a program/data required for allowing the pre-stage image processing DSP 1001 to carry out scanner processing is downloaded in the pre-stage image processing DSP 1001, a test pattern image outputting program/data required for carrying out printing output of a test pattern image when possible unauthorized copy is found is downloaded in the post-stage image processing DSP 1002 from the DSP control device 201 when power supply is turned on in the image forming apparatus.

The same as in the second embodiment, the pre-stage image processing DSP 1001 carries out predetermined image processing (scanner processing) on an input image based on the main program and the newly downloaded program/data. Then, the security processing DSP 203 carries out pattern matching processing on the image having thus undergone the predetermined image processing. The program/data required for carrying out the pattern matching processing is previously downloaded from the DSP control device 201 as described above. As a result of the pattern matching processing, the security processing DSP 203 generates and stores a thus-produced unauthorized copy determination result (for example, value indicating OK or NG) in a predetermined address of the memory part 603.

The unauthorized copy detecting part 403 of the DSP control device 201 can read various sorts of data stored in the memory part 603 of the security processing DSP 203. After turning on of power supply in the image forming apparatus, the unauthorized copy detecting part 403 monitors for a timing at which the unauthorized copy determination is carried out by the security processing DSP 203 since the setting was made on the operation part 301, and, reads the value of the unauthorized copy determination result from the data area 603b of the memory part 603 of the security processing DSP 203. The unauthorized copy detecting part 403 determines, from the thus-read value, whether or not unauthorized copy is being carried out.

When the unauthorized copy detecting part 403 detects from the read value that unauthorized copy is being carried out, the reading part 405 reads an image processing program or image processing data, from the program/data storage 404, for allowing the test pattern image outputting program/data to properly operate, which is previously downloaded in the post-stage image processing DSP 1002 as mentioned above. The thus-read image processing program or image processing data is downloaded by the program/data transfer part 406 and is stored in a predetermined address of the memory part of the post-stage image processing DSP 1002. Then, the post-stage image processing DSP 1002 causes the test pattern image outputting program/data to properly operate based on the thus-newly-downloaded image processing program or image processing data, carries out printing processing, and outputs the test pattern image accordingly.

On the other hand, when the unauthorized copy detecting part 403 determines from the read value that no unauthorized copy is being carried out, the same processing as that in the second embodiment for the same case is carried out.

Thus, in the unauthorized copy preventing system according to the third embodiment of the present invention, a system size increases in comparison to the first embodiment since the image processing DSP is separated into the two stages as in the second embodiment. However, since it is possible to improve the efficiency of the image pattern matching, it is possible to shorten a processing time required for detecting possible unauthorized copy.

As described above, the copier having the unauthorized copy preventing system according to the present invention, carrying out the unauthorized copy preventing method according to the present invention by executing the unauthorized copy preventing program, has a copyguard function. For example, a document is produced by means of a common personal computer (PC), and, upon printing out the document, the document is output on a printing paper with a special pattern superposed therewith for the purpose of copy protection. Then, when the thus-obtained document is copied with the use of the copier having the unauthorized copy preventing function according to the present invention, the special pattern thus superposed is detected (by means of the pattern matching processing mentioned above), and then, the image thus produced is destroyed by the copier. That is, as described above, an image (i.e., an image produce by dummy data) from which a human being cannot determine the contents is produced instead of a proper copy. Thereby, it is possible to avoid unauthorized copy with a strong deterrent. It is preferable that a copier or a printer having the function according to the present invention is configured to carry out printing out an image having the special pattern superposed therewith, or, a general-purpose copier or printer has the same function. Further, it is possible to further provide a higher deterrent function, by applying a tint block or such in such a manner that, after a document, which is printed out with the tint block or such embedded therein previously, is copied with the use of a common copier not having the unauthorized copy preventing function in an unauthorized copy manner, the tint block embedded character string may be visualized on the image thus obtained by the copy operation, for the purpose of avoiding unauthorized copy.

Thus, according to the unauthorized copy preventing system, the unauthorized copy preventing method and the unauthorized copy preventing program according to the present invention, it is possible to control the image processing DSP and the security processing DSP by the single system, and to achieve miniaturization of the system, improvement of the efficiency of the processing, and improvement of the accuracy.

The unauthorized copy preventing method according to each embodiment of the present invention may be carried out as a result of a previously produced program being executed by a computer such as a personal computer, a work station or such. This program may be recorded in a computer readable information recording medium such as a hard disk 104, a flexible disk 106, a CD-ROM 116 (see FIG. 1), an MO, a DVD or such, and is executed as a result of it being read from the information recording medium by the computer (CPU 101). It is also possible that this program is delivered by means of a communication network such as the Internet or such (114, also see FIG. 1).

Thus, the unauthorized copy preventing system, the unauthorized copy preventing method and the unauthorized copy preventing program according to the present invention are useful for image processing with the use of DSP, and in particular, are suitable to an image forming apparatus such as a digital copier.

Further, the present invention is not limited to the above-described embodiments, and variations and modifications may be made without departing from the basic concept of the present invention claimed below.

The present application is based on Japanese Priority Application No. 2004-029975 filed on Feb. 5, 2004, the entire contents of which are hereby incorporated herein by reference.

What is claimed is:

1. An unauthorized copy preventing system for preventing an unauthorized copy of an image in an image forming apparatus configured to carry out image forming by carrying out a predetermined processing on digital image information, the unauthorized copy preventing system comprising:
    a digital signal processor for image processing configured to carry out a predetermined image processing on the image;
    a digital signal processor for security processing configured to produce an unauthorized copy determination result for determining whether or not the unauthorized copy is being carried out on the image having undergone the image processing by said digital signal processor for image processing; and
    a digital signal processor control device configured to control said digital signal processor for image processing and said digital signal processor for security processing and to prevent the unauthorized copy,
    said digital signal processor control device including,
        a power supply turning on detecting part configured to detect a power supply of the image forming apparatus turning on, to produce a detection result;
        a program/data downloading part configured to download, based on the detection result of said power supply turning on detecting part, an image processing program/data to said digital signal processor for image processing and a security processing program/data to said digital signal processor for security processing, wherein
    the digital signal processor for image processing is further configured to execute the image processing program/data to carry out the predetermined image processing, and
    the digital signal processor for security processing is further configured to execute the security processing program/data to produce the unauthorized copy determination result.

2. The unauthorized copy preventing system as claimed in claim 1, wherein said digital signal processor control device comprises:
    a set condition detecting part configured to detect a setting of a processing condition in the image forming apparatus;
    an unauthorized copy detecting part configured to detect, from the unauthorized copy determination result produced by the digital signal processor for security processing, whether or not the unauthorized copy is being carried out, wherein
    said program/data downloading part is further configured to download, based on detection results of said set condition detecting part and said unauthorized copy detecting part, a predetermined program/data in one of said digital signal processor for image processing and said digital signal processor for security processing.

3. The unauthorized copy preventing system as claimed in claim 2, wherein said program/data downloading part comprises:
    a program/data storage configured to store therein an image processing program/data for causing said digital signal processor for image processing to execute the predetermined image processing, and a security processing program/data for causing said digital signal processor for security processing to execute a predetermined security processing;
    a reading part configured to read an associated program/data from said program/data storage based on the detection results of said power supply turning on detecting part, said set condition detecting part and said unauthorized copy detecting part; and
    a program/data transferring part configured to transfer the associated program/data read out by said reading part to said digital signal processor for image processing or said digital signal processor for security processing.

4. The unauthorized copy preventing system as claimed in claim 3, wherein said program downloading part comprises:
    a transferred program/data storage configured to temporarily store therein program/data the same as that transferred by said program/data transferring part; and
    a writing part configured to write a program/data the same as that transferred by said program/data transferring part in said transferred program/data storage.

5. The unauthorized copy preventing system as claimed in claim 4, wherein when detecting the setting of the processing condition of the image forming apparatus, said set condition detecting part searches said transferred program/data storage, and, then, when detecting that there is no associated program/data in said transferred program/data storage to download in said digital signal processor for image processing, said set condition detecting part causes said program/data downloading part to download the associated program/data in said digital signal processor for image processing or in said digital signal processor for security processing.

6. The unauthorized copy preventing system as claimed in claim 2, wherein when detecting an alteration of image size change ratio setting in the image forming apparatus, said set condition detecting part causes said program/data downloading part to download difference data corresponding to the altered image size change ratio in said digital signal processor for security processing.

7. The unauthorized copy preventing system as claimed in claim 4, wherein,
    when detecting that the unauthorized copy is being carried out, said unauthorized copy detecting part searches said transferred program/data storage, and when detecting that there is no program/data, in said transferred program/data storage, for causing said digital signal processor for image processing to carry out a printing processing for a security processing for said digital signal processor for image processing, said unauthorized copy detecting part causes said program/data downloading part to download a program/data for causing said digital signal processor for image processing to carry out the printing processing for the security processing for said digital signal processor for image processing.

8. The unauthorized copy preventing system as claimed in claim 7, wherein when detecting that the unauthorized copy is being carried out, said unauthorized copy detecting part causes said program/data downloading part to download, in said digital signal processor for image processing, dummy data.

9. The unauthorized copy preventing system as claimed in claim 1, wherein said digital signal processor for image processing comprises:
an internal control part configured to control a predetermined image processing operation based on a program/data downloaded from said digital signal processor control device;
a memory part configured to temporarily store therein a program/data downloaded from said digital signal processor control device; and
a path switching part configured to switch a path for selecting image information to send to the digital signal processor for security processing according to the control of said internal control part.

10. The unauthorized copy preventing system as claimed in claim 9, wherein said internal control part of said digital signal processor for image processing carries out a scanner processing including black correction, γ correction or position alignment registration correction.

11. The unauthorized copy preventing system as claimed in claim 10, wherein said path switching part of said digital signal processor for image processing is configured to switch a path when a predetermined number of steps of a processing of the scanner processing have been finished, and to send image information having thus undergone the scanner processing to said digital signal processor for security processing.

12. The unauthorized copy preventing system as claimed in claim 1, wherein said digital signal processor for security processing comprises:
an internal control part configured to control an operation of generating the unauthorized copy determination result for determining whether or not the unauthorized copy is being carried out based on a program/data downloaded from said digital signal processor control device; and
a memory part configured to temporarily store therein the unauthorized copy determination result generated by said internal control part.

13. The unauthorized copy preventing system as claimed in claim 12, wherein said internal control part of said digital signal processor for security processing is configured to carry out pattern matching on image information having undergone a scanner processing carried out by said digital signal processor for image processing, and to generate the unauthorized copy determination result for determining whether or not the unauthorized copy is being carried out.

14. The unauthorized copy preventing system as claimed in claim 12, wherein an unauthorized copy detecting part of said digital signal processor control device is configured to detect, from the unauthorized copy determination result stored in said memory part of said digital signal processor for security processing, that the unauthorized copy is being carried out.

15. The unauthorized copy preventing system as claimed in claim 12, wherein said digital signal processor control device further comprises:
an initializing part configured to monitor an operation of said digital signal processor for image processing, and, upon a detection of a finish of the operation of said digital signal processor for image processing, to carry out an initializing processing on said memory part of said digital signal processor for security processing.

16. The unauthorized copy preventing system as claimed in claim 1, wherein said digital signal processor for image processing comprises:
a digital signal processor for pre-image processing configured to carry out a scanner processing, and
a digital signal processor for post-image processing configured to carry out a printing processing.

17. A method for preventing an unauthorized copy of an image in an image forming apparatus configured to carry out image forming by performing a predetermined processing on digital image information, the method comprising:
carrying out an initial setting for preventing the unauthorized copy;
carrying out a predetermined processing for carrying out a special image processing;
carrying out a predetermined processing for responding to a size change ratio alteration;
carrying out a scanner processing on an input image;
carrying out a pattern matching processing on image information processed in said carrying out the scanner processing step, and generating an unauthorized copy determination result for determining whether or not the unauthorized copy is being carried out;
detecting, at the image forming apparatus, as to whether or not the unauthorized copy is being carried out, based on the unauthorized copy determination result generated in said generating step; and
carrying out a predetermined processing for preventing the unauthorized copy, at the image forming apparatus, based on a detection result of said detecting step.

18. The unauthorized copy preventing method as claimed in claim 17, wherein said carrying out the initial setting step comprises downloading a program for an image processing and a program for a security processing in a digital signal processor for image processing and a digital signal processor for security processing included in the image forming apparatus, respectively, when a power supply in the image forming apparatus is turned on.

19. The unauthorized copy preventing method as claimed in claim 17, wherein said carrying out the predetermined processing for carrying out the special image processing step comprises downloading, when the special image processing is selected in the image forming apparatus, a program/data for an image processing for carrying out said image processing in a digital signal processor for image processing included in the image forming apparatus.

20. The unauthorized copy preventing method as claimed in claim 17, wherein said carrying out the predetermined processing for responding to the size change ratio alteration step comprises downloading, when the size change ratio is altered, difference data used for carrying out an image pattern matching processing responsive to the size change ratio, in a digital signal processor for security processing included in the image forming apparatus.

21. The unauthorized copy preventing method as claimed in claim 17, wherein said carrying out the predetermined processing for preventing the unauthorized copy step comprises:

downloading, when the unauthorized copy is detected in said detecting step, a program/data for a printing processing for preventing the unauthorized copy, in a digital signal processor for image processing included in the image forming apparatus, and causing said digital signal processor for image processing to output an image, different from an input image, including dummy data; and downloading, when no unauthorized copy is detected in said detecting step, a program/data for a normal printing processing in said digital signal processor for image processing, and causing said digital signal processor for image processing to output an image corresponding to the input image.

22. A computer readable information recording medium storing therein an unauthorized copy preventing program, including instructions for causing a computer to execute each step of an unauthorized copy preventing method, comprising:

performing an initial setting for preventing the unauthorized copy, when a power supply of the computer is turned on;

performing a special image processing, when the special image processing is selected;

responding to an alteration of a size change ratio, when the size change ratio is altered;

performing a scanner processing on an input image;

performing a pattern matching processing, on image information processed in said performing the scanner processing, to produce an unauthorized copy determination result;

determining whether the unauthorized copy is being carried out, based on the unauthorized copy determination result, to produce a determination result; and downloading a program/data based on the determination result.

23. The computer readable information recording medium claimed in claim 22, wherein said performing the initial setting comprises:

downloading a program for an image processing to a digital signal processor for image processing included in the computer; and downloading a program for a security processing to a digital signal processor for security processing included in the computer.

24. The computer readable information recording medium claimed in claim 22, wherein said performing the special image processing comprises downloading a program/data for an image processing for carrying out said image processing to a digital signal processor for image processing included in the computer.

25. The computer readable information recording medium claimed in claim 22, wherein said responding comprises downloading difference data, for carrying out an image pattern matching processing responsive to the size change ratio, to a digital signal processor for security processing included in the computer.

26. The computer readable information recording medium claimed in claim 22, the unauthorized copy preventing method further comprising:

outputting, with a digital signal processor for image processing included in the computer, an image corresponding to the input image, when the determination result indicates that the unauthorized copy is not being carried out;

outputting, with said digital signal processor for image processing, an image based on dummy data, when the determination result indicates that the unauthorized copy is being carried out, wherein, the program/data is downloaded to said digital signal processor for image processing, when the determination result indicates that the unauthorized copy is being carried out, the program/data is associated with a printing processing for preventing the unauthorized copy, and when the determination result indicates that the unauthorized copy is not being carried out, the program/data is associated with a normal printing processing.

* * * * *